US012580190B2

(12) United States Patent
Moon et al.

(10) Patent No.: US 12,580,190 B2
(45) Date of Patent: Mar. 17, 2026

(54) POSITIVE ELECTRODE ACTIVE MATERIAL AND LITHIUM SECONDARY BATTERY USING THE SAME

(71) Applicant: ECOPRO BM CO., LTD., Cheongju-si (KR)

(72) Inventors: Chae Won Moon, Cheongju-si (KR); Hyung Jong Yu, Cheongju-si (KR); Jung Bae Park, Cheongju-si (KR); Moon Ho Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 920 days.

(21) Appl. No.: 17/696,472

(22) Filed: Mar. 16, 2022

(65) Prior Publication Data

US 2022/0320506 A1     Oct. 6, 2022

(30) Foreign Application Priority Data

Mar. 31, 2021     (KR) ......................... 10-2021-0041749

(51) Int. Cl.
*H01M 4/525* (2010.01)
*C01G 45/12* (2025.01)
(Continued)

(52) U.S. Cl.
CPC ............ *H01M 4/525* (2013.01); *C01G 45/12* (2013.01); *C01G 53/50* (2013.01); *H01M 4/131* (2013.01);
(Continued)

(58) Field of Classification Search
CPC .... H01M 4/525; H01M 4/131; H01M 4/1391; H01M 4/366; H01M 4/505;
(Continued)

(56) References Cited

U.S. PATENT DOCUMENTS

| | | | | |
|---|---|---|---|---|
| 9,391,327 B2* | 7/2016 | Nomura | ................. | C01G 53/42 |
| 2009/0166187 A1* | 7/2009 | Nagase | ................. | H01M 4/485 |
| | | | | 204/298.13 |
| 2020/0083531 A1* | 3/2020 | Choi | ...................... | C01G 53/50 |

FOREIGN PATENT DOCUMENTS

| | | |
|---|---|---|
| CN | 102386395 A | 3/2012 |
| CN | 111446488 A | 7/2020 |
| KR | 10-2019-0086403 A | 7/2019 |
| KR | 10-2020-0029961 A | 3/2020 |
| KR | 10-2020-0110027 A | 9/2020 |
| KR | 10-2021-0022199 A | 3/2021 |

OTHER PUBLICATIONS

Garcia, Juan C. et al., "Surface Structure, Morphology, and Stability of Li(Ni1/3Mn1/3Co1/3)O2 Cathode Material," American Chemical Society, vol. 121, pp. 8290-8299 (Year: 2017).*

(Continued)

*Primary Examiner* — Ula C Ruddock
*Assistant Examiner* — Sydney L Kline
(74) *Attorney, Agent, or Firm* — Studebaker Brackett PLLC

(57) ABSTRACT

The present invention relates to a positive electrode active material which is formed such that a lithium ion diffusion path in a lithium composite oxide constituting a positive electrode active material is directed to a specific crystal plane, and has improved electrochemical properties and stability by improving the growth of the crystal plane to which the lithium ion diffusion path is directed, and a lithium secondary battery using the same.

15 Claims, 3 Drawing Sheets

(51) Int. Cl.

| | |
|---|---|
| *C01G 53/50* | (2025.01) |
| *H01M 4/02* | (2006.01) |
| *H01M 4/131* | (2010.01) |
| *H01M 4/1391* | (2010.01) |
| *H01M 4/36* | (2006.01) |
| *H01M 4/505* | (2010.01) |
| *H01M 4/62* | (2006.01) |
| *H01M 10/0525* | (2010.01) |

(52) U.S. Cl.
CPC ......... *H01M 4/1391* (2013.01); *H01M 4/366* (2013.01); *H01M 4/505* (2013.01); *H01M 4/62* (2013.01); *H01M 10/0525* (2013.01); *C01P 2002/74* (2013.01); *C01P 2004/03* (2013.01); *H01M 2004/021* (2013.01); *H01M 2004/028* (2013.01)

(58) Field of Classification Search
CPC ....... H01M 10/0525; H01M 2004/021; H01M 2004/028; C01G 53/50; C01G 45/12
See application file for complete search history.

(56) References Cited

OTHER PUBLICATIONS

Voronov V.A. et al., "Effect of the preparation method of the cathode material LiNi0.33Mn0.33Co0.33O2 on the electrochemical characteristics of a lithium ion cell", Russian Journal of Inorganic Chemistry, vol. 61, No. 9, pp. 1153-1159, Oct. 4, 2016, doi: 10.1134/S0036023616090217.

Wang Yuesheng et al., "Layered oxides-LiNi1/3Co1/3Mn1/3O2 as anode electrode for symmetric rechargeable lithium-ion batteries", Journal of Power Sources, vol. 378, pp. 516-521, Jan. 5, 2018, doi: 10.1016/j.jpowsour.2017.12.043.

Tang Wenjie et al., "Enhanced cyclability and safety performance of LiNi0.6Co0.2Mn0.2O2 at elevated temperature by AIPO4 modification", Journal of Alloys and Compounds, vol. 810, p. 151834 (1-10), Aug. 12, 2019, doi: 10.1016/j.jallcom.2019.151834.

Li, Jing, et al., Comparison of Single Crystal and Polycrystalline LiNi0.5Mn0.3Co0.2O2 Positive Electrode Materials for High Voltage Li-Ion Cells; Journal of The Electrochemical Society, vol. 164, No. 7, p. A1534-A1544; May 23, 2017.

\* cited by examiner

POSITIVE ELECTRODE ACTIVE MATERIAL AND LITHIUM SECONDARY BATTERY USING THE SAME

CROSS-REFERENCE TO RELATED APPLICATION

This application claims priority to and the benefit of Korean Patent Application No. 10-2021-0041749, filed on Mar. 31, 2021, the disclosure of which is incorporated herein by reference in its entirety.

BACKGROUND

1. Field of the Invention

The present invention relates to a positive electrode active material which is formed such that a lithium ion diffusion path in a lithium composite oxide constituting a positive electrode active material is directed to a specific crystal plane, and has improved electrochemical properties and stability by improving the growth of the crystal plane to which the lithium ion diffusion path is directed, and a lithium secondary battery using the same.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of $LiOH$ and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

To compensate for these shortcomings, as a positive electrode active material for a secondary battery, the demand for a high-Ni-type positive electrode active material having an Ni content of 50% or more has started to increase. However, such a high-Ni-type positive electrode active material exhibits high capacity characteristics, and as the Ni content in the positive electrode active material increases, there is a problem of causing structural instability due to Li/Ni cation mixing. The structural instability of the positive electrode active material may lead to rapid deterioration of a lithium secondary battery not only at high temperatures but also at room temperature.

Meanwhile, recently, not only a positive electrode active material including a including a polycrystalline lithium composite oxide but also a positive electrode active material including a single-crystal lithium composite oxide have been suggested (Journal of The Electrochemical Society, Volume 164, Number 7, A1534-A1544 (Publication Date: 2017 May 23)).

This document discloses that a single-crystal lithium composite oxide ($LiNi_{0.5}Mn_{0.3}Co_{0.2}O_2$) having a crystallite size of 2 to 3 µm has partially improved stability, compared to a polycrystalline lithium composite oxide having the same composition.

However, when a calcination temperature is excessively increased or extended for single crystallization of a lithium composite oxide constituting a positive electrode active material, the above-described cation mixing phenomenon may increase.

Particularly, when the cation mixing phenomenon increases in the single-crystal lithium composite oxide, excessive lithium composite oxides having a metastable or rock-salt phase, in addition to the originally intended layered structure, may be formed, and due to the presence of excessive lithium composite oxides having a phase other than a layered structure, the deterioration of the positive electrode active material, which is an aggregate thereof, may be caused. The deterioration of the positive electrode active material causes a decrease in capacity and a decrease in lifespan.

Therefore, there is a clear limitation in providing a single-crystal positive electrode active material by increasing only the calcination temperature of the lithium composite oxide constituting the positive electrode active material.

SUMMARY OF THE INVENTION

In a positive electrode active material for a lithium secondary battery, a predetermined trade-off relation can be established between some indices indicating the electrochemical properties and some indices indicating stability. Therefore, when the capacity characteristics of the positive electrode active material are excessively improved, conversely, as the structural stability of particles constituting the positive electrode active material is lowered, there is a concern that stable charging/discharging performance cannot be exhibited.

Accordingly, the present invention is directed to providing a positive electrode active material which is able to maintain high electrochemical properties and resolve the low structural stability of a conventional positive electrode active material for a lithium secondary battery, particularly, a high-Ni-type positive electrode active material.

The present invention is also directed to providing a positive electrode active material which is formed such that a lithium ion diffusion path in a lithium composite oxide constituting a positive electrode active material is directed to a specific crystal plane, and has improved electrochemical properties and stability by improving the growth of the crystal plane to which the lithium ion diffusion path is directed.

The present invention is also directed to providing a lithium secondary battery employing the positive electrode active material defined above.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by the means indicated by the claims and a combination thereof.

One aspect of the present invention provides a positive electrode active material which includes a layered lithium composite oxide enabling the intercalation/deintercalation of lithium, and the ratio of peak intensities attributed to the (003) and (012) planes obtained from X-ray diffraction analysis using a Cu-Kα ray with respect to the lithium composite oxide satisfies Equation 1 below.

$$0.131 \leq I(012)/I(003) \leq 0.143 \qquad \text{[Equation 1]}$$

In addition, the lithium composite oxide may have a shape with major and minor axes, and here, a lithium ion diffusion path formed in the lithium composite oxide may be formed to be parallel to the major axis direction of the lithium composite oxide.

In addition, the lithium ion diffusion path formed in the lithium composite oxide is formed to be parallel to the (003) plane, and the lithium ion diffusion path formed in the lithium composite oxide may be formed to be directed to at least one crystal plane selected from a (012) plane, a (101) plane and a (104) plane, thereby improving the lithium ion diffusion capacity mediated by the lithium composite oxide and the electrochemical properties of the positive electrode active material including the lithium composite oxide.

Here, the lithium composite oxide may be represented by Formula 1 below.

$$Li_aNi_{1-(b+c+d+e)}Co_bM1_cM2_dM3_eO_f \qquad \text{[Formula 1]}$$

(Here, M1 is at least one selected from Mn and Al, M2 and M3 are each independently selected from Al, Ba, B, Ce, Cr, Mg, Mn, Mo, Na, K, P, Sr, Ti, W, Nb and Zr, M1 to M3 are different from each other, $0.90 \leq a \leq 1.15$, $0 \leq b \leq 0.20$, $0 \leq c \leq 0.10$, $0 \leq d \leq 0.05$, $0 \leq e \leq 0.05$, and $1.0 \leq f \leq 2.0$)

In one embodiment, the lithium composite oxide includes at least one primary particle, and on the cross-sectional SEM image of the lithium composite oxide, the grain boundary density calculated by Equation 5 below with respect to the primary particles on the imaginary straight line passing through the center of the lithium composite oxide may be 0.50 or less.

Grain boundary density=(the number of interfaces
between primary particles on the imaginary
straight line/the number of primary particles on
the imaginary straight line)      [Equation 5]

Here, the lithium composite oxide may have a single-crystal structure.

In another embodiment, the positive electrode active material is an aggregate of a plurality of lithium composite oxides consisting of at least one primary particle, and on the cross-sectional SEM image of the lithium composite oxide of the aggregate, the proportion of the lithium composite oxides which have a grain boundary density calculated by Equation 5 below with respect to the primary particles on the imaginary straight line passing through the center of the lithium composite oxide of 0.50 or less may be 30% or more.

Grain boundary density=(the number of interfaces
between primary particles on the imaginary
straight line/the number of primary particles on
the imaginary straight line)      [Equation 5]

Another aspect of the present invention provides a positive electrode active material which includes a layered lithium composite oxide enabling the intercalation/deintercalation of lithium, in which the lithium composite oxide includes at least one primary particle, and on the cross-sectional SEM image of the lithium composite oxide, the grain boundary density calculated by Equation 5 below with respect to the primary particles on the imaginary straight line passing through the center of the lithium composite oxide is 0.50 or less.

Grain boundary density=(the number of interfaces
between primary particles on the imaginary
straight line/the number of primary particles on
the imaginary straight line)      [Equation 5]

The lithium ion diffusion path formed in the lithium composite oxide is formed to be directed to at least one crystal plane selected from a (012) plane, a (101) plane and a (104) plane.

Still another aspect of the present invention provides a positive electrode active material including a layered lithium composite oxide enabling the intercalation/deintercalation of lithium, in which the positive electrode active material is an aggregate of a plurality of lithium composite oxides consisting of at least one primary particle, and on the cross-sectional SEM image of the lithium composite oxide of the aggregate, the proportion of the lithium composite oxides which have a grain boundary density calculated by Equation 5 below with respect to the primary particles on the imaginary straight line passing through the center of the lithium composite oxide of 0.50 or less is 30% or more.

Grain boundary density=(the number of interfaces
between primary particles on the imaginary
straight line/the number of primary particles on
the imaginary straight line)      [Equation 5]

The lithium ion diffusion path formed in the lithium composite oxide is formed to be directed to at least one crystal plane selected from a (012) plane, a (101) plane and a (104) plane.

Yet another aspect of the present invention provides a lithium secondary battery employing the positive electrode active material defined above.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
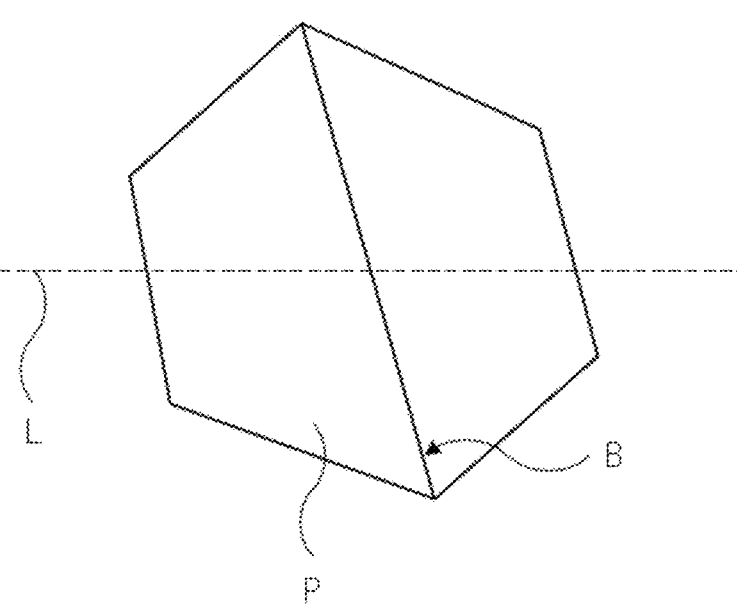
FIGS. 1 and 2 are schematic diagrams of the cross-sectional images of lithium composite oxides included in positive electrode active materials according to various embodiments of the present invention.

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless specifically indicated in the context, the singular forms include plural forms thereof, and the plural terms also include singular forms thereof.

Glossary of Terms

The term "lithium composite oxide" used herein is a layered oxide capable of intercalation/deintercalation of lithium (lithium ions), and refers to a composite oxide containing lithium and a metal element. Particularly, the lithium composite oxide used herein refers to a lithium-nickel-based composite oxide containing lithium and nickel. In addition, the lithium composite oxide used herein is an oxide particle constituting a positive electrode active material, which may be a single-crystal particle (that is, a single particle type) or a polycrystalline particle (that is, a type in which a plurality of particles are aggregated).

The term "single crystal" used herein means a crystal that does not include a grain or grain boundary in the particle. In addition, the term "primary particle" used herein refers to a particle independently present without forming an aggregate, or a primary particle constituting a secondary particle formed by aggregating a plurality of the primary particles. The "lithium composite oxide having a single-crystal structure" means a particle in which a primary particle consisting of a lithium composite oxide consists of a plurality of grains or there is no grain in the primary particle.

The term "secondary particle" used herein refers to a primary particle itself, which is the above-described lithium composite oxide, or a particle in which two primary particles are aggregated. In this case, a secondary particle consisting of a single primary particle and/or a secondary particle in which at least two primary particles are aggregated may coexist in the positive electrode active material. When the secondary particle is formed by aggregating at least two primary particles, there is a grain boundary formed at the interface between two primary particles in the secondary particle.

The term "grain boundary density" means the number of grain boundaries formed by the presence of at least two primary particles in a secondary particle, and as the number of primary particles present in the secondary particle increases, the grain boundary density may increase, and as the number of primary particles present in the secondary particle decreases, the grain boundary density may decrease.

The grain boundary density in the present invention may be calculated by the number of primary particles on the imaginary straight line passing through the center of the lithium composite oxide on the cross-sectional SEM image of the lithium composite oxide according to Equation 5 below. Here, the direction of the straight line may be a direction passing through the center of the lithium composite oxide in a minor axis direction.

$$\text{Grain boundary density} = \text{(the number of interfaces between primary particles on the imaginary straight line/the number of primary particles on the imaginary straight line)} \quad \text{[Equation 5]}$$

When there is one primary particle present in the secondary particle, the grain boundary density calculated according to the above equation may be 0, and when there are three or more primary particles present in the secondary particle, the grain boundary density calculated according to the above equation may be more than 0.5.

Meanwhile, in the present invention, the secondary particle may be a particle consisting of a single primary particle having a single-crystal structure, but the present invention is not necessarily limited thereto. That is, in the present invention, it will be understood that the secondary particle consists of a single crystal particle, or is a particle formed by aggregating at least two single crystal particles. The definition of such a secondary particle may be more clearly explained by the definition of a positive electrode active material to be described below.

The term "positive electrode active material" used herein may be, as a broad concept including the secondary particles described above, a single secondary particle itself, and in the present invention, an aggregate of a plurality of secondary particles having the same and/or different grain boundary densities may be defined as a positive electrode active material.

Therefore, in the definition of a positive electrode active material to be described below, the description of the secondary particle having the characteristic of an aggregate of a plurality of secondary particles and the descriptions of a secondary particle and a primary particle constituting the secondary particle, which constitute the positive electrode active material need to be understood separately.

Hereinafter, a positive electrode active material according to the present invention, and a lithium secondary battery employing a positive electrode including the positive electrode active material will be described in further detail.

Positive Electrode Active Material

According to one aspect of the present invention, a positive electrode active material including a layered lithium composite oxide enabling the intercalation/deintercalation of lithium is provided.

The lithium composite oxide may include at least one primary particle, and when the lithium composite oxide includes a plurality of primary particles, the plurality of primary particles may be present as a secondary particle, which is an aggregate of the primary particles. On the other hand, when the lithium composite oxide includes a single primary particle, the lithium composite oxide may be referred to as a single-crystal lithium composite oxide.

The primary particle refers to one grain (or crystallite), and the secondary particle refers to an aggregate formed by aggregating a plurality of primary particles. In addition, the primary particle may be formed in a rod, oval, and/or round shape(s), or may be amorphous.

There may be a void and/or a grain boundary between the primary particles constituting the secondary particle. For example, the primary particle may be spaced apart from a neighboring primary particle in the secondary particle to form an internal void. In addition, the primary particle may be in contact with an internal void to form a surface present in the secondary particle, without forming a grain boundary by being in contact with a neighboring primary particle.

Meanwhile, a surface where the primary particle present at the outermost surface of the secondary particle is exposed to external air creates the surface of the secondary particle.

Here, as the average particle diameter of the primary particle may be 0.1 to 10 μm, and preferably, 1.0 to 10 μm, the optimal density of a positive electrode prepared using positive electrode active materials according to various embodiments of the present invention may be achieved. In addition, the average particle diameter of the secondary particle may vary according to the number of aggregated primary particles, and may be 3 to 20 μm.

Meanwhile, the positive electrode active material according to the present invention may be defined as an aggregate of a plurality of secondary particles having the same and/or different grain boundary densities.

The grain boundary density may be calculated based on the number of primary particles (P) on the imaginary straight line (L) passing through the center of the lithium composite oxide on the cross-sectional SEM image of the lithium composite oxide according to Equation 5 below.

$$\text{Grain boundary density} = \text{(the number of interfaces } (B) \text{ between primary particles on the imaginary straight line } (L)/\text{the number of primary particles } (P) \text{ on the imaginary straight line } (L)) \qquad \text{[Equation 5]}$$

For example, the grain boundary density of a lithium composite oxide calculated with reference to FIGS. 1 and 2, which are schematic diagrams of the cross-sectional images of the lithium composite oxides included in the positive electrode active materials according to various embodiments of the present invention is shown in Table 1 below.

TABLE 1

Figure 2:
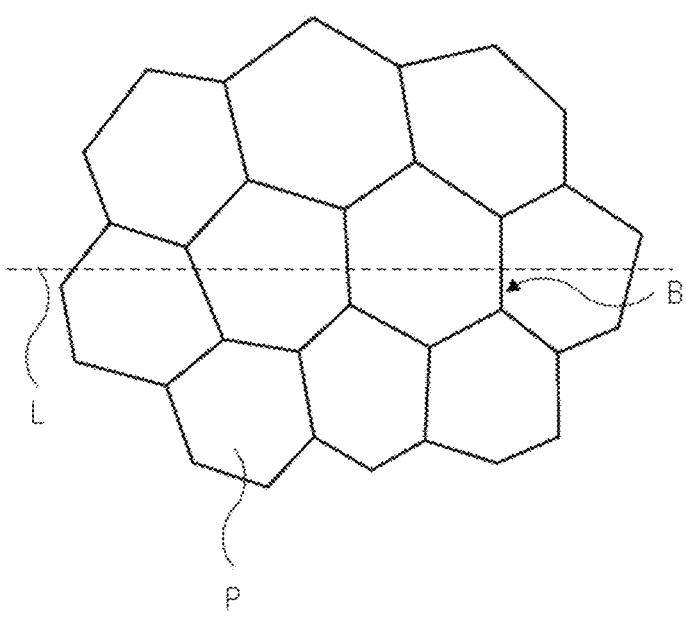
Figure 3:
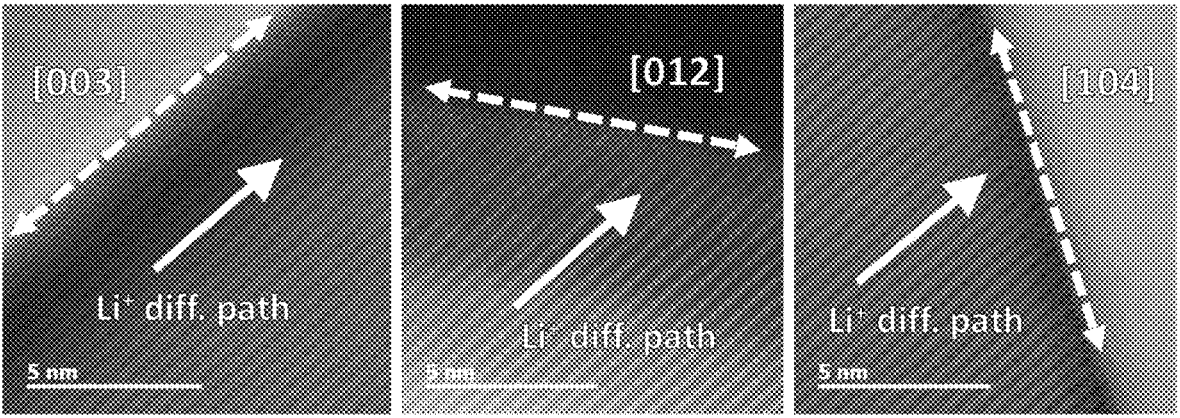
FIGS. 3 to 6 are TEM images of lithium composite oxides included in positive electrode active materials according to Examples 1, 2, 3 and 5 of the present invention, showing lithium ion diffusion paths of the lithium composite oxides in the TEM images.
Figure 4:
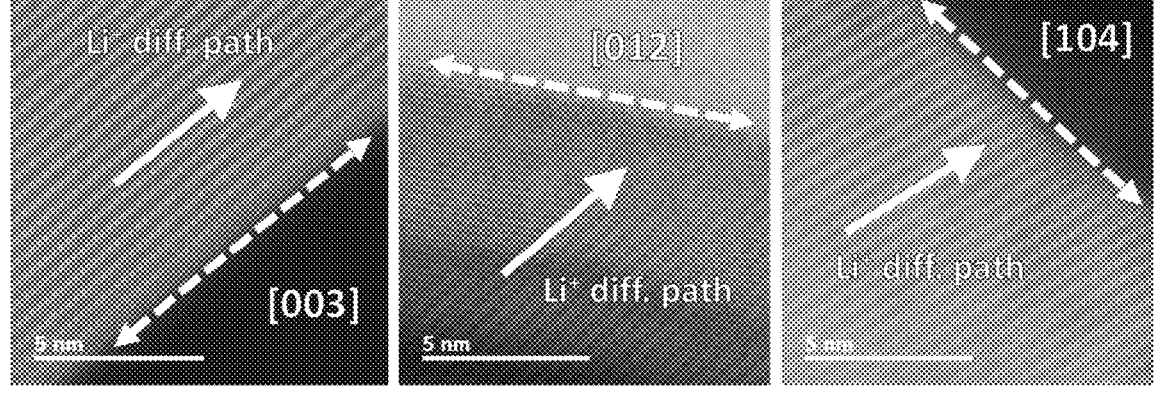
Figure 5:
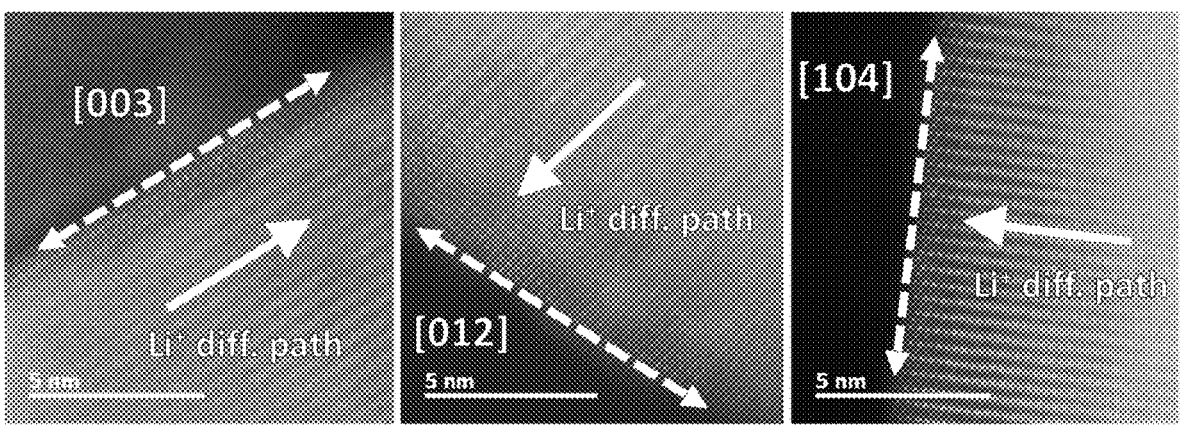
Figure 6:
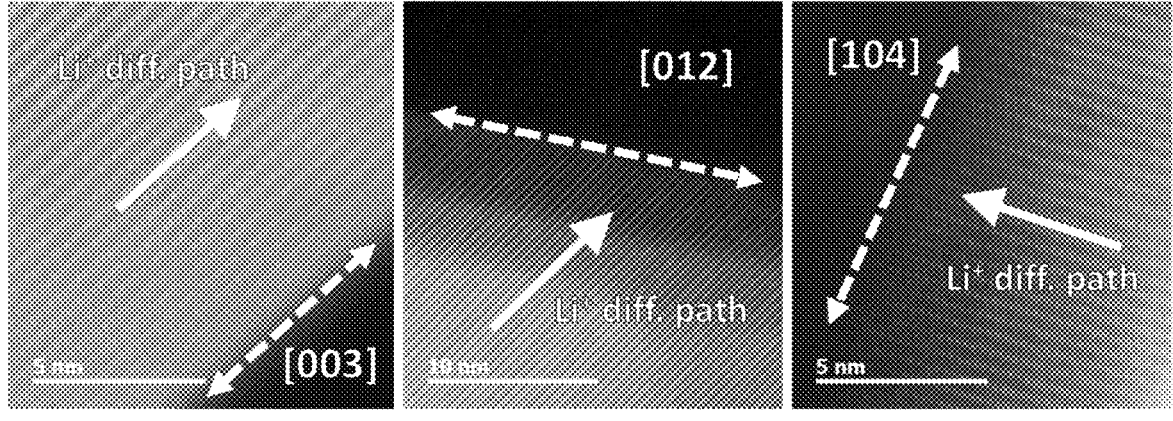

| Classification | FIG. 1 | FIG. 2 |
|---|---|---|
| Number of interfaces (grain boundaries) between primary particles on the imaginary straight line | 1 | 3 |
| Number of primary particles on the imaginary straight line | 2 | 4 |
| Grain boundary density | 0.5 | 0.75 |

As the grain boundary density expressed by Equation 5 is 0.90 or less, the surface area and the grain boundary of the lithium composite oxide may be reduced, and therefore, the high temperature stability and storage stability of the positive electrode active material may be improved by reducing the possibility of a side reaction between the positive electrode active material and an electrolyte solution.

Meanwhile, according to one embodiment of the present invention, on the cross-sectional SEM image of the lithium composite oxide of the aggregate of the secondary particles, the proportion of the lithium composite oxides which have a grain boundary density calculated by Equation 5 below with respect to the primary particles on the imaginary straight line passing through the center of the lithium composite oxide of 0.50 or less may be 30% or more.

The surface area of the lithium composite oxide included in the positive electrode active material and the grain boundary defined by the primary particles constituting the lithium composite oxide are regions in which side reactions between the interface and surfaces of the positive electrode active material and the electrolyte solution may occur. Here, as shown in FIGS. 1 and 2, the grain boundary defined by the primary particles present in the lithium composite oxide may be understood as, for example, the interface between two adjacent primary particles.

Here, by reducing the surface area of the lithium composite oxide and the grain boundary defined by the primary particles in the lithium composite oxide, it is possible to improve the thermal stability of the positive electrode active material and prevent or alleviate a problem caused by instability of the positive electrode active material (e.g., the decrease in storage stability such as gas generation due to a side reaction with an electrolyte solution).

Accordingly, as the proportion of a lithium composite oxide having the grain boundary density calculated by Equation 5 of 0.50 or less in the aggregate of the secondary particles is set to be 30% or more, it is possible to provide a positive electrode active material with stably maintained electrochemical properties.

Meanwhile, the proportion of a lithium composite oxide having the grain boundary density calculated by Equation 5 of 0.50 or less in the aggregate of the secondary particles may be improved by changing process conditions of some steps in the process of synthesizing the lithium composite oxide. For example, the proportion of the lithium composite oxide having a grain boundary density of 0.50 or less may be improved by adjusting a first calcination temperature/time for a precursor of the lithium composite oxide and/or a second calcination temperature/time for the first calcination resultant of the precursor.

However, as the calcination conditions for the precursor and/or the lithium composite oxide become relatively harsh, a cation mixing phenomenon may increase, and the cation mixing phenomenon may cause the phase transformation of the lithium composite oxide.

Therefore, as the proportion of the lithium composite oxide having the grain boundary density calculated by Equation 5 of 0.50 or less in the aggregate of the secondary particles is set to be 95% or less, preferably 90% or less, and more preferably 80% or less, it is possible to strike a balance between a lithium composite oxide having a grain boundary density of 0.50 or less and a lithium composite oxide having a grain boundary density of more than 0.50.

The lithium composite oxide according to one embodiment of the present invention may include at least Ni and Co. In addition, the lithium composite oxide may further include Mn and/or Al in addition to Ni and Co, and may further include a dopant other than the above-described metal elements.

Specifically, the lithium composite oxide may be represented by Formula 1 below.

$$\text{Li}_a\text{Ni}_{1-(b+c+d+e)}\text{Co}_b\text{M1}_c\text{M2}_d\text{M3}_e\text{O}_f \qquad \text{[Formula 1]}$$

(Here, M1 is at least one selected from Mn and Al, M2 and M3 are each independently selected from Al, Ba, B, Ce, Cr, Mg, Mn, Mo, Na, K, P, Sr, Ti, W, Nb and Zr, M1 to M3 are different from each other, $0.90 \le a \le 1.15$, $0 \le b \le 0.20$, $0 \le c \le 0.10$, $0 \le d \le 0.05$, $0 \le e \le 0.05$, and $1.0 \le f \le 2.0$)

Meanwhile, the lithium composite oxide may be a high-Ni-type lithium composite oxide in which the molar ratio of Ni calculated by Equation 4 below in the lithium composite oxide represented by Formula 1 may be 0.6 or more, preferably, 0.7, and more preferably 0.8 or more.

$$Ni \text{ (molar ratio)} = Ni \text{ (mol \%)}/(Ni \text{ (mol \%)} + Co \text{ (mol \%)} + M1 \text{ (mol \%)} + M2 \text{ (mol \%)} + M3 \text{ (mol \%)}) \qquad \text{[Equation 4]}$$

As described above, the high-Ni-type lithium composite oxide may have relatively high electrochemical properties compared to a lithium composite oxide having a low Ni content, and as the Ni content in the lithium composite oxide increases, a problem of structural instability is caused by Li/Ni cation mixing. Due to the structural instability of the positive electrode active material, a lithium secondary battery may be rapidly deteriorated not only at high temperatures but also at room temperature.

However, although the lithium composite oxide according to the present invention has a high-Ni-type composition, by controlling the characteristics of a crystal plane or exposed surface to be described below, it is possible to improve the electrochemical properties and prevent the decrease in stability of the lithium composite oxide.

Specifically, the lithium ion diffusion path formed in the lithium composite oxide may be formed to be parallel to the major axis direction of the lithium composite oxide, thereby improving the diffusion capacity of the lithium ions by means of the lithium composite oxide.

Here, the lithium ion diffusion path refers to a major one-dimensional and/or two-dimensional path(s) through which lithium ions in the lithium composite oxide are transported/diffused according to a vacancy hopping mechanism.

In addition, the lithium ion diffusion path is preferably formed to be parallel to the (003) plane confirmed by X-ray diffraction analysis using the Cu-Kα ray with respect to the lithium composite oxide. When the lithium ion diffusion path in the lithium composite oxide is formed to be directed to the (003) plane, the diffusion of the lithium ions may be blocked by the (003) plane, and thus the diffusion capacity of the lithium ions may likely be reduced by means of the lithium composite oxide.

Meanwhile, the lithium ion diffusion path may be formed to be directed to at least one crystal plane selected from the (012) plane, the (101) plane and the (104) plane in which lithium ions are relatively free to diffuse, compared to the (003) plane, thereby improving the diffusion capacity of the lithium ions by means of the lithium composite oxide.

That is, according to the present invention, the lithium ion diffusion path in the lithium composite oxide constituting the positive electrode active material for a lithium secondary battery may be formed to be directed to a crystal plane in which lithium ions are relatively free to diffuse, instead of being directed to a crystal plane in which the diffusion of lithium ions is blocked, and thus an improvement in electrochemical properties of the positive electrode active material including the lithium composite oxide may be expected.

Here, the lithium ion diffusion path being directed to a specific crystal plane means that an angle between a direction perpendicular to the specific crystal plane and a direction of the lithium ion diffusion path may be 90 degrees or less, preferably, 60 degrees or less, and more preferably 45 degrees or less.

In addition, according to the present invention, before first calcination obtaining the lithium composite oxide through thermal treatment of a hydroxide precursor of the lithium composite oxide, a flux was input to a mixture of the hydroxide precursor and a lithium raw material (e.g., LiOH) and then thermal treatment was performed, and thus the growth of the crystal plane to which the lithium ion diffusion path is directed may be improved. Particularly, before first calcination, by thermal treatment after a flux is input to the mixture of the hydroxide precursor and the lithium raw material (e.g., LiOH), compared to the crystal plane in which the diffusion of lithium ions is blocked, the growth of the crystal plane in which the lithium ions are relatively free to diffuse may be further improved.

As the flux used to improve the growth of the crystal plane in which the lithium ions are relatively free to diffuse, for example, an alkali metal compound such as NaOH, KCl or NaNO$_3$ (a hydroxide, a chloride, a nitride, a carbonate, a sulfate or the like) or a chloride such as NH$_4$Cl may be used.

Meanwhile, the ratio of peak intensities attributed to (003) and (012) planes obtained from X-ray diffraction analysis using the Cu-Kα ray with respect to the lithium composite oxide may satisfy Equation 1 below.

$$0.131 \leq I(012)/I(003) \leq 0.143 \qquad \text{[Equation 1]}$$

When I(012)/I(003) calculated by Equation 1 is less than 0.131, compared to the (003) plane in which the diffusion of lithium ions is blocked, due to the lack of growth of the (012) plane in which lithium ions are relatively free to diffuse, the effect of improving the electrochemical properties of the lithium composite oxide according to the growth of a crystal plane to which the lithium ion diffusion path is directed may be insignificant.

On the other hand, when the I(012)/I(003) calculated by Equation 1 is more than 0.143, as the growth of the (012) plane formed along the longitudinal direction of the lithium ion diffusion path excessively increases, there is a concern that the diffusion capacity of the lithium ions mediated by the lithium composite oxide, or the stability of the crystal structure of the lithium composite oxide is rather reduced.

In addition, the ratio of peak intensities attributed to (003) and (104) planes obtained from X-ray diffraction analysis using the Cu-Kα ray with respect to the lithium composite oxide may satisfy Equation 2 below.

$$0.630 \leq I(104)/I(003) \leq 0.698 \qquad \text{[Equation 2]}$$

Likewise, when I(104)/I(003) calculated by Equation 2 is less than 0.630, compared to the (003) plane in which the diffusion of lithium ions is blocked, due to the lack of growth of the (104) plane in which lithium ions are relatively free to diffuse, the effect of improving the electrochemical properties of the lithium composite oxide according to the growth of a crystal plane to which the lithium ion diffusion path is directed may be insignificant.

On the other hand, when the I(104)/I(003) calculated by Equation 2 is more than 0.698, as the growth of the (104) plane formed along the longitudinal direction of the lithium ion diffusion path excessively increases, there is a concern that the diffusion capacity of the lithium ions mediated by the lithium composite oxide, or the stability of the crystal structure of the lithium composite oxide is rather reduced.

In addition, the ratio of peak intensities attributed to (003) and (101) planes obtained from X-ray diffraction analysis using the Cu-Kα ray with respect to the lithium composite oxide may satisfy Equation 3 below.

$$0.379 \leq I(101)/I(003) \leq 0.421 \qquad \text{[Equation 3]}$$

Likewise, when I(101)/I(003) calculated by Equation 3 is less than 0.379, compared to the (003) plane in which the diffusion of lithium ions is blocked, due to the lack of growth of the (101) plane in which lithium ions are relatively free to diffuse, the effect of improving the electrochemical properties of the lithium composite oxide according to the growth of a crystal plane to which the lithium ion diffusion path is directed may be insignificant.

On the other hand, when the I(101)/I(003) calculated by Equation 3 is more than 0.421, as the growth of the (101) plane formed along the longitudinal direction of the lithium ion diffusion path excessively increases, there is a concern that the diffusion capacity of the lithium ions mediated by the lithium composite oxide, or the stability of the crystal structure of the lithium composite oxide is rather reduced.

In addition, a lithium composite oxide included in positive electrode active materials according to some embodiment of the present invention may include the primary particles (e.g., a grain boundary between the primary particles) and/or a coating layer covering at least a part of the surface of a secondary particle formed by aggregating the primary particles.

For example, the coating layer may be present to cover at least a part of the exposed surface of the primary particle.

Particularly, the coating layer may be present to cover at least a part of the exposed surface of the primary particle present at the outermost surface of the secondary particle.

Accordingly, the coating layer may be present as a layer that continuously or discontinuously coats the primary particle and/or the surface of the secondary particle formed by aggregating the primary particles. When the coating layer is discontinuously present, it has an island shape.

The coating layer present as such may contribute to maintaining high electrochemical properties and resolving the low structural stability of a lithium composite oxide, particularly, a high-Ni-type lithium composite oxide.

In addition, the coating layer may be present in the form of a solid solution that does not form a boundary between the primary particles and/or the secondary particles formed by aggregating the primary particles.

The coating layer may include at least one oxide represented by Formula 2 below. That is, the coating layer may be defined as a region in which the oxide represented by Formula 2 below is present.

$$Li_aA_bO_c \qquad \text{[Formula 2]}$$

(Here, A is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, and $2 \leq c \leq 15$.)

In addition, the coating layer may have a form in which different types of oxides are present in one layer, or different types of oxides represented by Formula 2 above are present in separate layers.

The oxide represented by Formula 2 may be physically and/or chemically bonded with the primary particle represented by Formula 1. In addition, the oxide may be present while being formed in a solid solution with the primary particle represented by Formula 1.

The lithium composite oxide according to the embodiment may include a coating layer covering at least a part of the primary particle (e.g., the interface between the primary particles) and/or the surface of a secondary particle formed by aggregating the primary particles, thereby increasing structural stability. In addition, when such a lithium composite oxide is used as a positive electrode active material for a lithium secondary battery, the electrochemical properties and stability of the positive electrode active material may be improved. In addition, the oxide may reduce residual lithium in the lithium composite oxide and serve as a migration pathway of lithium ions.

In addition, in some cases, the oxide may not only be present on at least a part of the interface between the primary particles and the surface of the secondary particle, but also present in internal voids formed in the secondary particle.

The oxide is an oxide in which lithium and an element represented by A or an oxide of A are combined, and may be expressed as, for example, $Li_aW_bO_c$, $Li_aZr_bO_c$, $Li_aTi_bO_c$, $Li_aNi_bO_c$, $Li_aB_bO_c$, $Zr_bO_c$, $Ti_bO_c$ or $B_bO_c$. In addition, non-limiting examples of the oxide include $Li_2B_4O_7$, $Li_3BO_3$, $Li_2B_2O_7$, $Li_2BgO_{13}$, $Li_2VO_3$, $Li_3VO_4$, $Li_6Zr_3O_9$, $Li_2ZrO_3$, $Li_{5.5}Zr_{2.62}O_8$, $Li_{44}Ba_{19}$, $Li_4Ba$, $Li_2TiO_3$, $LiTi_7O_4$ and $LiTi_2O_4$. The above examples are merely described for convenience of understanding, and the oxide defined in the present invention is not limited to the above-described examples.

In another embodiment, the oxide may be or may further include an oxide in which lithium and at least two types of elements represented by A are combined. The oxide in which lithium and at least two types of elements represented by A are combined may be, for example, $Li_a(W/Ti)_bO_c$, $Li_a(W/$ $Zr)_bO_c$, $Li_a(W/Ti/Zr)_bO_c$, or $Li_a(W/Ti/B)_bO_c$, but the present invention is not necessarily limited thereto.

Here, the oxide may have a concentration gradient decreasing from the surface to the center of the secondary particle. Accordingly, the concentration of the oxide may decrease from the surface to the center of the secondary particle.

As described above, as the oxide has a concentration gradient decreasing from the surface to the center of the secondary particle, residual lithium present on the surface of the lithium composite oxide may be effectively reduced, thereby preventing a side reaction caused by unreacted residual lithium in advance. In addition, a decrease in crystallinity in the inner surface region of the lithium composite oxide caused by the oxide may be prevented. In addition, the breakdown of the entire structure of the lithium composite oxide due to the oxide in an electrochemical reaction may be prevented.

In addition, the coating layer may include a first coating layer including at least one oxide represented by Formula 2, and, a second coating layer including at least one oxide represented by Formula 2 which is different from the oxide included in the first coating layer.

For example, the first coating layer may be present to cover at least a part of the exposed surface of the primary particle present at the outermost surface of the secondary particle, and the second coating layer may be present to cover at least a part of the exposed surface of the primary particle that is not covered by the first coating layer and the surface of the first coating layer.

Lithium Secondary Battery

Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator film and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator film, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ (0<β<2), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

In addition, in another exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator film is not particularly limited as long as it is generally used in a lithium secondary battery to separate a negative electrode from a positive electrode and provide a diffusion path for lithium ions, and particularly, the separator film has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator film including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Preparation Example 1. Preparation of Positive Electrode Active Material

Example 1

Through a known co-precipitation method using nickel sulfate, cobalt sulfate and manganese sulfate, a NiCoMn $(OH)_2$ hydroxide precursor (Ni:Co:Mn=91:8:1 (at %)) of a lithium composite oxide was synthesized. The average particle diameter (D50) of the hydroxide precursor of the lithium composite oxide was 3.0 μm.

Subsequently, a lithium composite oxide was obtained by mixing LiOH(Li/(Ni+Co+Mn) mol ratio=1.05±0.05) with the first hydroxide precursor, and thermally treating (first calcination) the resulting mixture for 12 hours in a calcination furnace while maintaining an $O_2$ atmosphere and elevating a temperature 2° C. per minute until 770° C. Here, 2.0 mol % of $NaNO_3$ was input with respect to the sum of the first hydroxide precursor and LiOH before initiation of the thermal treatment.

After the first calcination was completed, the lithium composite oxide was put into distilled water, stirred for 1 hour, and dried in a vacuum drier at 120° C. for 12 hours.

Finally, a positive electrode active material including the lithium composite oxide was obtained by thermal treatment (second calcination) for 12 hours in a calcination furnace while maintaining an $O_2$ atmosphere and elevating a temperature 2° C. per minute until 700° C.

Example 2

A positive electrode active material was prepared in the same manner as described in Example 1, except that 3.0 mol % of $NH_4Cl$ was used instead of 2.0 mol % of $NaNO_3$.

Example 3

A positive electrode active material was prepared in the same manner as described in Example 1, except that 1.0 mol % of KCl was used instead of 2.0 mol % of $NaNO_3$.

Example 4

A positive electrode active material was prepared in the same manner as described in Example 1, except that 3.0 mol % of KCl was used instead of 2.0 mol % of $NaNO_3$.

Example 5

A positive electrode active material was prepared in the same manner as described in Example 1, except that 3.0 mol % of NaOH was used instead of 2.0 mol % of $NaNO_3$.

Example 6

A positive electrode active material was prepared in the same manner as described in Example 1, except that 5.0 mol % of NaOH was used instead of 2.0 mol % of $NaNO_3$.

Example 7

A positive electrode active material was prepared in the same manner as described in Example 1, except that 3.0 mol % of NaCl was used instead of 2.0 mol % of $NaNO_3$.

Comparative Example 1

A positive electrode active material was prepared in the same manner as described in Example 1, except that $NaNO_3$ was not input before first calcination.

Comparative Example 2

A positive electrode active material was prepared in the same manner as described in Example 1, except that 0.5 mol % of $NH_4Cl$ was used instead of 2.0 mol % of $NaNO_3$.

Comparative Example 3

A positive electrode active material was prepared in the same manner as described in Example 1, except that 1.0 mol % of $NH_4Cl$ was used instead of 2.0 mol % of $NaNO_3$.

Comparative Example 4

A positive electrode active material was prepared in the same manner as described in Example 1, except that 0.5 mol % of KCl was used instead of 2.0 mol % of $NaNO_3$.

Comparative Example 5

A positive electrode active material was prepared in the same manner as described in Example 1, except that 1.0 mol % of NaOH was used instead of 2.0 mol % of $NaNO_3$.

Comparative Example 6

A positive electrode active material was prepared in the same manner as described in Example 1, except that the content of $NaNO_3$ input before first calcination was 3.0 mol %.

Comparative Example 7

A positive electrode active material was prepared in the same manner as described in Example 1, except that the content of $NaNO_3$ input before first calcination was 5.0 mol %.

Comparative Example 8

A positive electrode active material was prepared in the same manner as described in Example 1, except that 5.0 mol %|NaCl was used instead of 2.0 mol % of $NaNO_3$.

Preparation Example 2. Production of Lithium Secondary Battery

A positive electrode slurry was prepared by dispersing 94 wt % of each of the positive electrode active materials prepared according to Preparation Example 1, 3 wt % of artificial graphite and 3 wt % of a PVDF binder in 3.5 g of N-methyl-2-pyrrolidone (NMP). The positive electrode slurry was applied to an aluminum (Al) thin film having a thickness of 20 μm as a positive electrode current collector and dried, and then subjected to roll pressing, thereby preparing a positive electrode. The positive electrode had a loading level of 7 $mg/cm^2$, and an electrode density of 3.2 $g/cm^3$. A coin battery was produced using a lithium foil as a counter electrode for the positive electrode, a porous polyethylene film (Celgard 2300, thickness: 25 μm) as a separator film, and an electrolyte solution in which $LiPF_6$ was present at a concentration of 1.15M in a solvent in which ethylene carbonate and ethyl methyl carbonate are mixed in a volume ratio of 3:7 according to a conventionally known production process.

Experimental Example 1. Structural Analysis of Positive Electrode Active Material (1) Cross-Sectional SEM Analysis of Positive Electrode Active Material Cross-sectional SEM images for lithium composite oxides included in the positive electrode active materials prepared according to Preparation Example 1 were obtained using FE-SEM (Bruker), and the proportion of a lithium composite oxide having a grain boundary density calculated by the following Equation 5 of 0.50 or less was calculated from the cross-sections of 100 lithium composite oxides captured on the cross-sectional SEM images.

Grain boundary density=(the number of interfaces between primary particles on the imaginary straight line/the number of primary particles on the imaginary straight line) [Equation 5]

The measurement results of the grain boundary density are shown in Table 2 below.

TABLE 2

| Classification | Rate (%) of lithium composite oxide having grain boundary density of 0.50 or less among total lithium composite oxides |
|---|---|
| Example 1 | 44 |
| Example 2 | 42 |
| Example 3 | 41 |
| Example 4 | 39 |
| Example 5 | 38 |
| Example 6 | 45 |
| Example 7 | 77 |
| Comparative Example 1 | 26 |
| Comparative Example 2 | 24 |
| Comparative Example 3 | 20 |
| Comparative Example 4 | 19 |
| Comparative Example 5 | 15 |
| Comparative Example 6 | 41 |
| Comparative Example 7 | 14 |
| Comparative Example 8 | 80 |

(2) TEM Analysis of Positive Electrode Active Material

After a TEM image for a lithium composite oxide included in each of the positive electrode active materials according to Examples 1, 2, 3 and 5 in Preparation Example 1 was obtained, the directionality of the lithium ion diffusion path formed in the lithium composite oxide was confirmed from the TEM image. In addition, a crystal plane of the lithium composite oxide to which a lithium ion diffusion path formed in the lithium composite oxide is directed was confirmed by indexing an SAD diffraction pattern. The measurement results are shown in FIGS. 3 to 6.

Referring to FIGS. 3 to 6, it can be confirmed that the lithium ion diffusion path formed in the lithium composite oxide included in each of the positive electrode active materials according to Examples 1, 2, 3 and 5 is formed in the same direction as the major axis direction of the lithium composite oxide. Particularly, it can be confirmed that the lithium ion diffusion path formed in the lithium composite oxide is formed in a direction substantially parallel to the (003) plane.

It can be confirmed that lithium ion diffusion paths formed in the lithium composite oxide are formed to be directed to the (012) plane, the (101) plane and/or the (104) plane.

That is, as lithium ion diffusion paths formed in a lithium composite oxide included in each of the positive electrode active materials according to Examples 1, 2, 3 and 5 are formed to be directed to the (012) plane, the (101) plane and/or the (104) plane in which lithium ions are relatively free to diffuse instead of being directed to the (003) plane in which the diffusion of lithium ions is blocked, an improvement in electrochemical properties of the positive electrode active materials including the lithium composite oxide can be expected.

(3) XRD Analysis of Positive Electrode Active Material

Peaks attributed to crystal planes of a lithium composite oxide included in the positive electrode active material were detected by performing X-ray diffraction (XRD) analysis for each of the positive electrode active materials prepared according to Preparation Example 1. The XRD analysis was performed with a Bruker D8 Advance diffractometer using Cu-Kα radiation (1.540598 Å), and the intensity ratio between peaks attributed to a specific crystal plane is shown in Tables 3 and 4 below.

TABLE 3

| Classification | Peak intensity ratio | | | |
| | (101)/(003) | (006)/(003) | (012)/(003) | (104)/(003) |
|---|---|---|---|---|
| Example 1 | 0.386 | 0.061 | 0.134 | 0.657 |
| Example 2 | 0.421 | 0.066 | 0.141 | 0.692 |
| Example 3 | 0.384 | 0.063 | 0.131 | 0.630 |
| Example 4 | 0.379 | 0.068 | 0.137 | 0.649 |
| Example 5 | 0.397 | 0.065 | 0.138 | 0.667 |
| Example 6 | 0.410 | 0.068 | 0.143 | 0.698 |
| Example 7 | 0.414 | 0.065 | 0.140 | 0.687 |
| Comparative Example 1 | 0.381 | 0.063 | 0.127 | 0.623 |
| Comparative Example 2 | 0.366 | 0.060 | 0.124 | 0.603 |
| Comparative Example 3 | 0.376 | 0.061 | 0.121 | 0.612 |
| Comparative Example 4 | 0.370 | 0.065 | 0.13 | 0.616 |
| Comparative Example 5 | 0.367 | 0.063 | 0.13 | 0.596 |
| Comparative Example 6 | 0.425 | 0.070 | 0.144 | 0.715 |
| Comparative | 0.396 | 0.064 | 0.136 | 0.655 |

TABLE 3-continued

| | Peak intensity ratio | | | |
|---|---|---|---|---|
| Classification | (101)/(003) | (006)/(003) | (012)/(003) | (104)/(003) |
| Example 7 Comparative Example 8 | 0.365 | 0.059 | 0.123 | 0.615 |

TABLE 4

| | Peak intensity ratio | | | | |
|---|---|---|---|---|---|
| Classification | (015)/(003) | (107)/(003) | (018)/(003) | (110)/(003) | (113)/(003) |
| Example 1 | 0.125 | 0.113 | 0.147 | 0.158 | 0.101 |
| Example 2 | 0.128 | 0.117 | 0.153 | 0.165 | 0.105 |
| Example 3 | 0.120 | 0.105 | 0.143 | 0.149 | 0.096 |
| Example 4 | 0.118 | 0.115 | 0.15 | 0.158 | 0.102 |
| Example 5 | 0.124 | 0.116 | 0.153 | 0.156 | 0.104 |
| Example 6 | 0.129 | 0.122 | 0.159 | 0.172 | 0.113 |
| Example 7 | 0.126 | 0.115 | 0.150 | 0.164 | 0.103 |
| Comparative Example 1 | 0.118 | 0.108 | 0.143 | 0.151 | 0.100 |
| Comparative Example 2 | 0.11 | 0.099 | 0.133 | 0.145 | 0.091 |
| Comparative Example 3 | 0.112 | 0.103 | 0.136 | 0.144 | 0.093 |
| Comparative Example 4 | 0.114 | 0.101 | 0.138 | 0.147 | 0.095 |
| Comparative Example 5 | 0.116 | 0.100 | 0.131 | 0.146 | 0.095 |
| Comparative Example 6 | 0.132 | 0.125 | 0.163 | 0.177 | 0.121 |
| Comparative Example 7 | 0.126 | 0.115 | 0.151 | 0.160 | 0.103 |
| Comparative Example 8 | 0.108 | 0.100 | 0.132 | 0.143 | 0.092 |

Experimental Example 2. Evaluation of Electrochemical Properties of Lithium Secondary Battery The efficiency of C-rates at 5.0 C/0.1 C were measured for the lithium secondary battery (coin shell) produced in Preparation Example 2 according to a charging and discharging test in which conditions such as 25° C., a voltage range of 3.0V to 4.3V and a discharging rate of 0.1 C to 5.0 C were applied using an electrochemical analyzer (Toyo, Toscat-3100).

In addition, 50 cycles of charging/discharging were performed on the same lithium secondary battery at 25° C., within a driving voltage range of 3.0V to 4.4V under a 1 C/1 C condition, and the ratio of the discharge capacity at 50 cycles with respect to the initial capacity (cycle capacity retention) was measured.

The measurement results are shown in Table 5 below.

TABLE 5

| Classification | C-rate efficiency (%) | Retention@50 cy (%) |
|---|---|---|
| Example 1 | 82.60% | 88.10% |
| Example 2 | 81.00% | 66.80% |
| Example 3 | 80.50% | 61.50% |
| Example 4 | 80.20% | 64.50% |
| Example 5 | 82.70% | 66.50% |
| Example 6 | 81.80% | 70.20% |
| Example 7 | 80.7% | 75.3% |
| Comparative Example 1 | 79.70% | 56.70% |
| Comparative Example 2 | 78.40% | 50.90% |
| Comparative Example 3 | 77.80% | 56.50% |

TABLE 5-continued

| Classification | C-rate efficiency (%) | Retention@50 cy (%) |
|---|---|---|
| Comparative Example 4 | 79.10% | 58.80% |
| Comparative Example 5 | 78.70% | 55.60% |
| Comparative Example 6 | 76.50% | 49.90% |
| Comparative Example 7 | 77.80% | 46.50% |
| Comparative Example 8 | 76.80% | 51.70% |

Referring to the results shown in Table 5, it can be confirmed that the lithium secondary batteries produced using the positive electrode active materials according to Examples 1 to 7 exhibited excellent effects in terms of C-rate efficiency (output characteristics) and cycle capacity retention compared to the lithium secondary batteries produced using positive electrode active materials according to Comparative Examples 1 to 8.

Specifically, in the case of Comparative Example 1, as the intentional growth of the crystal plane to which the lithium ion diffusion path is directed is excluded, it can be confirmed that the electrochemical properties of Comparative Example 1 are lower than those of Examples 1 to 7.

Meanwhile, in the case of Comparative Example 7 in which the content of $NaNO_3$ input before first calcination was set to be 5.0 mol %, it is expected that the electrochemical properties are lower than those of Examples 1 to 7 as the proportion of a lithium composite oxide having a grain boundary density of 0.5 or less among the total lithium composite oxides constituting a positive electrode active material is excessively lowered.

In addition, in the case of Comparative Example 8 in which the content of NaCl input before first calcination was set to be 5.0 mol %, it is rather expected that the electrochemical properties are lower than those of Examples 1 to 8 as the proportion of a lithium composite oxide having a grain boundary density of 0.5 or less among the total lithium composite oxides constituting a positive electrode active material is excessively increased.

Experimental Example 2. Evaluation of Stability of Positive Electrode Active Material To measure the weight loss rate of each of the positive electrode active materials prepared according to Preparation Example 1, TGA-MS equipment was used to measure the weight loss rate while the temperature was raised to 810° C. at a temperature elevating rate of 10° C./min in an Ar atmosphere under normal pressure. Here, since the intensity of an MS signal may be changed, the amount of a sample to be measured was 65 to 66 mg.

The weight loss rate of the positive electrode prepared in Preparation Example 2 was also measured in the same manner as described above, and the temperature at which the weight loss peak first appeared was measured.

The measurement results are shown in Table 6 below.

TABLE 6

| Classification | Weight loss rate (%) of positive electrode active material | TGA Peak (° C.) of positive electrode plate |
|---|---|---|
| Example 1 | 0.85 | 230 |
| Example 2 | 0.9 | 229.2 |
| Example 3 | 0.91 | 228.4 |
| Example 4 | 0.91 | 231.6 |
| Example 5 | 0.8 | 238.1 |
| Example 6 | 0.7 | 240.7 |
| Example 7 | 0.78 | 238.8 |
| Comparative Example 1 | 1.09 | 226.3 |
| Comparative Example 2 | 0.99 | 227 |
| Comparative Example 3 | 1.03 | 224.8 |
| Comparative Example 4 | 1.05 | 225.2 |
| Comparative Example 5 | 1.13 | 226.4 |
| Comparative Example 6 | 0.93 | 228.3 |
| Comparative Example 7 | 1.07 | 223.9 |
| Comparative Example 8 | 0.92 | 229.1 |

Referring to the results shown in Table 6, it can be confirmed that the thermal stability of the positive electrode active materials according to Examples 1 to 7 is generally higher than the positive electrode active materials according to Comparative Examples 1 to 8. It can be confirmed that the stability of the positive electrode active materials is complexly related to the proportion of a lithium composite oxide having a grain boundary density of 0.5 or less among the total lithium composite oxides constituting the positive electrode active material and intentional growth of a specific crystal plane of the lithium composite oxide.

According to the present invention, as a lithium ion diffusion path in a lithium composite oxide constituting a positive electrode active material for a lithium secondary battery is formed to be directed to a crystal plane in which lithium ions are relatively free to diffuse without being directed to a crystal plane in which the diffusion of lithium ions is blocked, an improvement in electrochemical properties of the positive electrode active material including the lithium composite oxide can be expected.

In addition, by intentionally improving the growth of the crystal plane in which lithium ions are relatively free to diffuse among the crystal planes in the lithium composite oxide, it is possible to improve the diffusion capacity of lithium ions through the lithium composite oxide.

Meanwhile, as disclosed in the Journal of The Electrochemical Society, Volume 164, Number 7, A1534-A1544, in general, for uniform single crystallization of a lithium composite oxide constituting a positive electrode active material for a lithium secondary battery, calcination needs to take place under relatively harsh conditions.

The lithium composite oxide having a single-crystal structure or a substantial single-crystal structure (e.g., reduced in the number of primary particles constituting a secondary particle), produced as described above, may be improved in stability as the specific surface area thereof is reduced compared to a polycrystalline lithium composite oxide.

However, under harsh calcination conditions, a cation mixing phenomenon may increase, and the cation mixing phenomenon causes the phase transformation of a lithium composite oxide to excessively form lithium composite oxides having a metastable or rock-salt phase in addition to an originally intended layered structure. As such, since excessive lithium composite oxides having other phases other than the layered structure coexist with layered lithium composite oxides, the positive electrode active material may be deteriorated.

Accordingly, in the present invention, it is possible to form a lithium ion diffusion path in a lithium composite oxide constituting a positive electrode active material to be directed to a specific crystal plane, and the growth of the crystal plane to which the lithium ion diffusion path is directed is improved, thereby being able to impart sufficient electrochemical properties and stability to the lithium composite oxide only by single crystallization performed under a relatively less harsh calcination condition.

In addition to the above-described effects, the specific effects of the present invention will be described together while describing specific details for carrying out the present invention below.

In the above, the embodiments of the present invention have been described, but it will be understood by those of ordinary skill in the art that the present invention may be changed and modified in various ways by addition, alteration, or deletion of components without departing from the spirit of the present invention defined in the appended claims.

What is claimed is:

1. A positive electrode active material, comprising:
a layered lithium composite oxide enabling the intercalation/deintercalation of lithium,
wherein the ratio of peak intensities attributed to (003) and (012) planes obtained from X-ray diffraction analysis using a Cu-Kα ray with respect to the lithium composite oxide satisfies Equation 1 below:

$$0.131 \leq I(012)/I(003) \leq 0.143. \quad \text{[Equation 1]}$$

2. The positive electrode active material of claim 1, wherein the ratio of peak intensities attributed to (003) and (104) planes obtained from X-ray diffraction analysis using the Cu-Kα ray with respect to the lithium composite oxide satisfies Equation 2 below:

$$0.630 \leq I(104)/I(003) \leq 0.698. \quad \text{[Equation 2]}$$

3. The positive electrode active material of claim 1, wherein the ratio of peak intensities attributed to (003) and (101) planes obtained from X-ray diffraction analysis using the Cu-Kα ray with respect to the lithium composite oxide satisfies Equation 3 below:

$$0.379 \leq I(101)/I(003) \leq 0.421. \quad \text{[Equation 3]}$$

4. The positive electrode active material of claim 1, wherein a lithium ion diffusion path formed in the lithium composite oxide is formed to be parallel to the major axis direction of the lithium composite oxide.

5. The positive electrode active material of claim 1, wherein a lithium ion diffusion path formed in the lithium composite oxide is formed to be parallel to the (003) plane.

6. The positive electrode active material of claim 1, wherein a lithium ion diffusion path formed in the lithium composite oxide is formed to be directed to at least one crystal plane selected from the (012) plane, a (101) plane and a (104) plane.

7. The positive electrode active material of claim 1, wherein the lithium composite oxide is represented by Formula 1 below:

$$Li_aNi_{1-(b+c+d+e)}Co_bM1_cM2_dM3_eO_f \qquad \text{[Formula 1]}$$

(Here,

M1 is at least one selected from Mn and Al,

M2 and M3 are each independently selected from Al, Ba, B, Ce, Cr, Mg, Mn, Mo, Na, K, P, Sr, Ti, W, Nb and Zr, M1 to M3 are different from each other, $0.90 \le a \le 1.15$, $0 \le b \le 0.20$, $0 \le c \le 0.10$, $0 \le d \le 0.05$, $0 \le e \le 0.05$, and $1.0 \le f \le 2.0$).

8. The positive electrode active material of claim 7, wherein the molar ratio of Ni calculated by Equation 4 below in the lithium composite oxide represented by Formula 1 is 0.6 or more:

$$Ni \text{ (molar ratio)}=Ni \text{ (mol \%)}/(Ni \text{ (mol \%)}+Co \text{ (mol} \\ \%)+M1 \text{ (mol \%)}+M2 \text{ (mol \%)}+M3 \text{ (mol \%)}). \qquad \text{[Equation 4]}$$

9. The positive electrode active material of claim 1, wherein the lithium composite oxide has an average particle diameter of 0.1 to 20 µm.

10. The positive electrode active material of claim 1, wherein the lithium composite oxide comprises at least one primary particle, and on the cross-sectional SEM image of the lithium composite oxide, the grain boundary density calculated by Equation 5 below with respect to primary particles on the imaginary straight line passing through the center of the lithium composite oxide is 0.50 or less:

Grain boundary density=(the number of interfaces between primary particles on the imaginary straight line/the number of primary particles on the imaginary straight line).     [Equation 5]

11. The positive electrode active material of claim 10, wherein the lithium composite oxide has a single-crystal structure.

12. The positive electrode active material of claim 1, wherein the positive electrode active material is an aggregate of a plurality of lithium composite oxides consisting of at least one primary particle, and on the cross-sectional SEM image of the lithium composite oxide of the aggregate, the proportion of the lithium composite oxides which have a grain boundary density calculated by Equation 5 below with respect to primary particles on the imaginary straight line passing through the center of the lithium composite oxide of 0.50 or less is 30% or more:

Grain boundary density=(the number of interfaces between primary particles on the imaginary straight line/the number of primary particles on the imaginary straight line).     [Equation 5]

13. The positive electrode active material of claim 1, further comprising:

a coating layer covering at least a part of the surface of the lithium composite oxide, which comprises:

at least one oxide represented by Formula 2 below:

$$Li_aA_bO_c \qquad \text{[Formula 2]}$$

(Here,

A is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \le a \le 10$, $0 \le b \le 8$, $2 \le c \le 15$).

14. A positive electrode comprising the positive electrode active material of claim 1.

15. A lithium secondary battery employing the positive electrode of claim 14.

\* \* \* \* \*